United States Patent [19]

Zinchuk

[11] 4,148,071
[45] Apr. 3, 1979

[54] APPARATUS FOR DISPLAYING MOVING FILM ON A TELEVISION RECEIVER

[75] Inventor: Michael Zinchuk, Waltham, Mass.

[73] Assignee: Polaroid Corporation, Cambridge, Mass.

[21] Appl. No.: 865,786

[22] Filed: Dec. 30, 1977

[51] Int. Cl.² .............................................. H04N 3/36
[52] U.S. Cl. .................................................... 358/214
[58] Field of Search ................ 358/214, 212, 213, 206

[56] References Cited

U.S. PATENT DOCUMENTS

| | | | |
|---|---|---|---|
| 2,831,055 | 4/1958 | Mattke | 358/214 |
| 3,506,778 | 4/1970 | Gold et al. | 358/5 |
| 3,769,574 | 10/1973 | Millward | 358/214 |
| 3,833,756 | 9/1974 | Kumagai | 358/54 |
| 3,949,161 | 4/1976 | Fujishima | 358/132 |
| 3,952,328 | 4/1976 | Biber | 358/54 |
| 3,953,885 | 4/1976 | Biber | 358/54 |
| 4,040,696 | 8/1977 | Starkweather | 358/206 |

*Primary Examiner*—Richard Murray
*Attorney, Agent, or Firm*—Edward S. Roman

[57] ABSTRACT

An apparatus for displaying a motion picture film on a television receiver are disclosed. The apparatus scans the images of frames from the film strip utilizing a lineal array of photosensitive elements and a scan rate corresponding to the field scan rate of a standard television receiver. A synchronization element controls a reflecting member, for example a rotating drum member having a plurality of mirrors mounted thereon, for providing time conversion from the film scanning rate to the television field scan rate. The reflecting member redirects projected images of the film frames across the array in a predetermined film frame scanning sequence. An electrical circuit sequentially samples the output of the lineal array and provides video output signals in a format compatible with the television receiver. Preferably, the television receiver is a standard, commercially available home television receiver, either in black and white or color. The motion picture film may be displayed over an unused channel of the television receiver.

16 Claims, 5 Drawing Figures

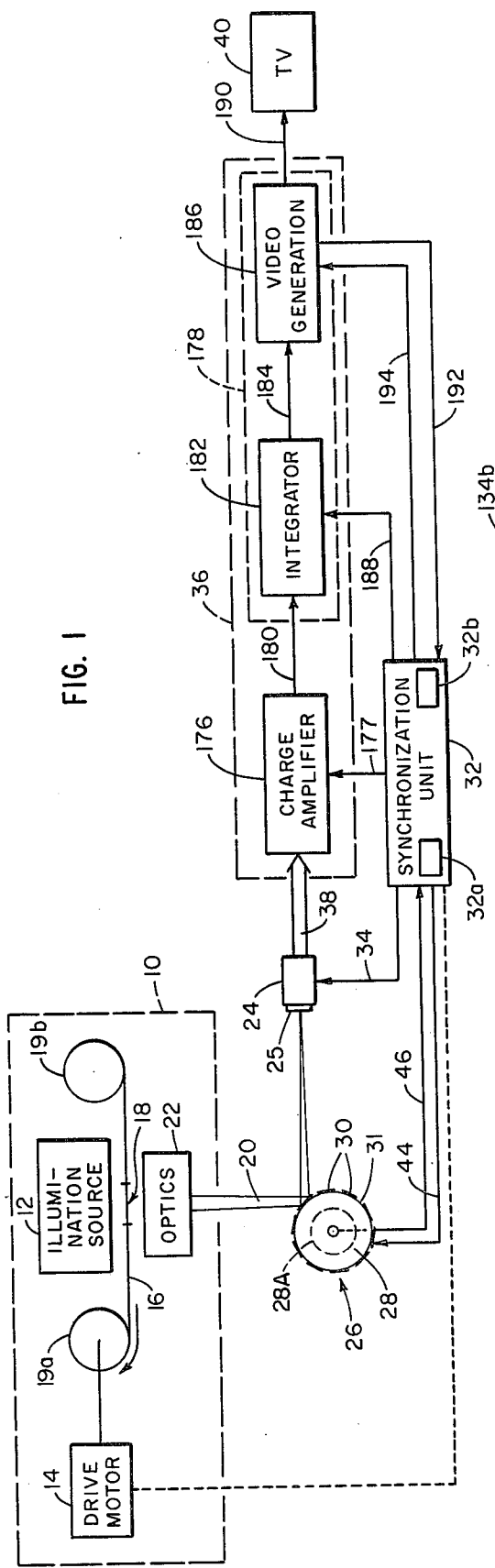
FIG. 1
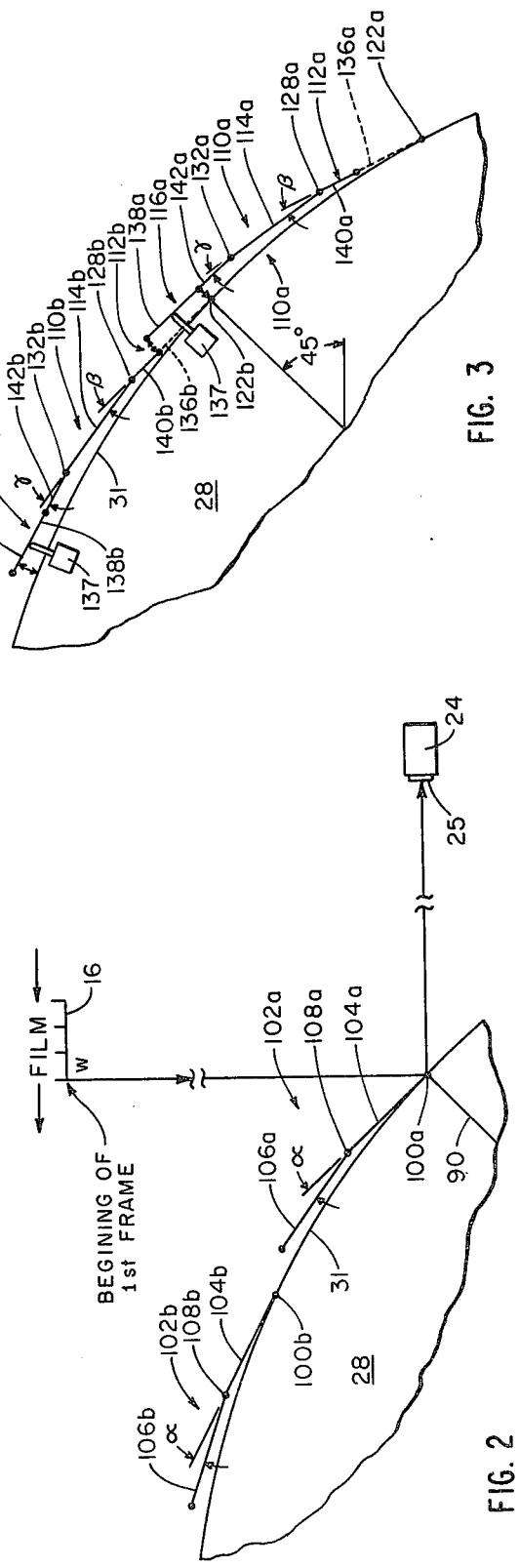
FIG. 3
FIG. 2

APPARATUS FOR DISPLAYING MOVING FILM ON A TELEVISION RECEIVER

BACKGROUND OF THE INVENTION

This invention relates to an apparatus and a method for displaying a motion picture film on a television receiver, and in particular, provides an apparatus and a method for displaying a continuously moving motion picture film on a commercially available home television receiver.

Many systems have been proposed for displaying a motion picture film on a television receiver. Generally, these systems fall into two classes. First, there are more sophisticated and complex systems which are employed commercially, for example, by television networks and local television stations, for broadcasting a motion picture film. These commercial systems typically broadcast the motion picture film at a rate of twenty-four film frames per second for reception on a stardard home television receiver operating at thirty complete frames (or sixty half-frame fields) per second. The equipment typically operates by scanning, with one of the many well-known prior art systems, alternate film frames different numbers of times. For example, the conventional commercial equipment maintains synchronism between the film and the television by scanning a first film frame twice (corresponding to two television fields), the next or second film frame three times (corresponding to three television fields), the third film frame twice, and the fourth film frame three times. The sequence then repeats for the next four film frames. The commercial equipment scans each film frame in a time corresponding to a television field scan and thus displays each pair of successive film frames in five consecutive television fields.

The film frames are thus synchronized by the equipment to the television deflection signals. Typically, commercial systems of this type are electrically complex, expensive, and inflexible with respect to changing the film frame rate. The specific equipment used in this approach, such as the flying spot scanner which has a moving spot-like illumination source, are discussed in more detail in the "Television Engineering Handbood," edited by Donald J. Fink and published in 1957 by McGraw-Hill Book Co., Inc.

As an alternative to the foregoing commercial systems, which are priced beyond the reach of the average amateur photographer, a number of less expensive, more flexible, and electronically simpler systems have been proposed. At least one of these systems, as disclosed in Biber, U.S. Pat. No. 3,952,328, issued Apr. 20, 1976, modifies the standard color television receiver horizontal and vertical deflection timing to provide a television field scan rate which matches and is effectively "slaved" to the film frame rate of the motion picture. By thus coupling the display apparatus directly to the television receiver, the motion picture film may be advanced at an arbitrary frame rate. While the system is commercially acceptable, it requires modification of the electrical circuitry of the receiver, and this requirement often places it beyond the ability or desirability of the typical amateur photographer of movie film, as well as other potential users. Thus, the amateur photographer who considers his home television receive a logical display mechanism for motion pictures, and in particular home movies, continues to search for a simpler and less expensive motion picture projector which will display a motion picture film onto an unmodified home television receiver.

It is therefore a principle object of this invention to provide a low cost apparatus for displaying a motion picture film on a standard television receiver. Other objects of the invention are to provide an apparatus for displaying a motion picture film on a television receiver which can be adapted for use at more than one film frame rate, which can easily be operated by an amateur photographer, and which advantageously incorporates today's high technology semiconductor components. Further objects of the invention are to provide such an apparatus which are simple and reliable in operation.

SUMMARY OF THE INVENTION

The apparatus for displaying successive frames of film, moving at a selected frame rate, on a television receiver operating with a selected field rate feature a photosensitive lineal array of photosensitive elements, for example photoelectric transducer elements. A projector continuously moves the film relative to a fixed illumination source at the film rate. The projector projects an image of the moving film along an optical path. The invention further features movable reflecting means stationed to receive projected light from the film strip and redirect the projected light onto the lineal array in a manner such that the projected image from each successive film frame is scanned by the lineal array in accordance with a predetermined film frame scanning sequence. A synchronizing unit synchronizes the film movement and the movement of the reflecting means to effect successive film frame scans across the lineal array according to the selected sequence and at a scan rate compatible with the television receiver field rate. An electrical circuit sequentially samples the output of the lineal array for generating television transmission signals compatible with the television receiver.

In a particularly preferred embodiment of the invention, the movable reflecting means features a rotating drum member having a cylindrical, peripheral surface on which is mounted a plurality of reflecting surfaces, such as prisms or mirrors. The synchronizing unit controls the speed of rotation of the rotating member. The placement of the mirrors around the periphery of the drum is determined by the geometric relationship of the projector, the array, and the rotating member; and by the rate of film movement and the rate of drum rotation.

The apparatus further features a drum member wherein the mirrors mounted thereon comprise a plurality of positionally repeating mirror groups spaced around the circular cylindrical drum periphery.

The foregoing features of the invention result in equipment that displays a motion picture film on a standard television receiver and that has significant economy. The features provide for a time conversion which enables the film to advance at rates different than the television field scan rate. Simultaneously, the equipment has substantially no storage requirement, and it is electronically and mechanically less complex than commercially available systems.

DESCRIPTION OF THE DRAWINGS

These and other objects, features, and advantages of the invention will appear from the following description of preferred embodiments of the invention taken together with the drawings in which:

FIG. 1 is a schematic diagram of display equipment according to the invention;

FIG. 2 is a detail of the mechanical placement of mirrors on a rotating drum according to one particular embodiment of the invention;

FIG. 3 is a detail of the mechanical placement of mirrors on a rotating drum according to a second particular embodiment of the invention.

DESCRIPTION OF PREFERRED EMBODIMENTS

Figure 2A:
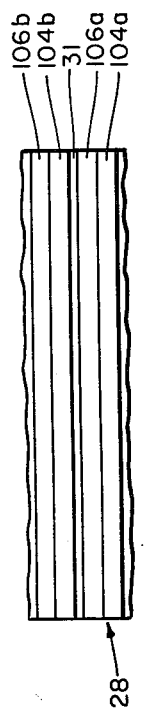
FIG. 2A is a fragmentary front view of the drum of FIG. 2.

Referring to FIG. 1, film to television display equipment according to the invention has a film projector 10 having a positionally fixed illumination source 12, for example the projection lamp and lens system of a movie projector, and a drive motor 14 for continuously advancing a film strip or motion picture film 16 past a projector viewing aperture 18. The motion picture film 16 extends between film take-up and supply spools 19a, 19b and the drive motor 14 connects to and drives take-up spool 19a. Illumination passing through the moving film at the viewing aperture projects through an optical focusing system 22 along an optical path 20 and to a positionally fixed elongated lineal array 24 comprising a plurality of photosensitive elements for converting video information to electrical signal information. Optical system 22 provides the image of the moving film with a selected focus at photosensitive surfaces 25 of the array 24.

A movable reflecting member 26, positioned in optical alignment with projector 10 and array 24, receives the projected image light from the film strip and redirects the projected light onto the array 24, for example by using mirrors or prisms, in a manner such that the projected image from each successive film frame is scanned by the array 24 in accordance with a predetermined film frame scanning sequence. The film frame scanning sequence correlates the film frame rate to the television scanning rate so that a television receiver can display the successive film frames in step with the moving film. The illustrated reflecting member 26 is a rotating reflecting drum 28 having a plurality of mirrors 30 mounted around the peripheral surface 31 thereof.

With further reference to FIG. 1, a synchronizing unit 32 selectively activates the array 24 by pulse signals over lines 34; and, in the preferred embodiment illustrated, an electrical circuit 36 sequentially receives the electrical output signals of the array over lines 38 and generates television signals compatible with a standard television receiver 40. The synchronization unit 32 synchronizes the drive motor 14, the reflecting member 26, and the electrical circuit 36 to generate a properly framed display on the television 40. Thus, when properly adjusted as described in greater detail below, the beginning of each film frame scan across the array corresponds to the beginning of a television field scan. To remain in synchronism, therefore, the reflecting member 26 directs the moving film frame image completely across array 24 so as to effect a complete scan of the entire film frame image by the array 24 in a time approximately equal to the time duration of a field scan (1/60 sec.). Thus the reflecting member 26 performs a time rate conversion function by controlling (and changing) the effective rate of movement of the film frame image across the array photosensitive surface 25.

In the illustrated motion picture film to television display apparatus, the film frame rate is advantageously chosen to be twenty frames per second and the television scan rate of a conventional home television is well known to be thirty frames, or sixty fields, per second. Thus each film frame corresponds, in time duration, to three field scans. Furthermore, in the United States, commercial television provides a total of 525 scan lines per frame or 262½ scan lines per field scan. (The literature, e.g. the television handbook noted above, describes the operation of a commercial television system in great detail).

In general operation, the illustrated display apparatus effects a scan of each frame image of the moving film across the photosensitive array at least twice. Other apparatus operating in accordance with the invention may effect a scan of each film frame image once, three times, or other different numbers of times across the array surface 25. In one particularly preferred illustrated embodiment of the invention (FIG. 2), the apparatus effects a scan of each film frame image across the array two times, each scan corresponding to one of two consecutive television field scans. Since each film frame corresponds in time to three field scans, this scanning method creates a "dead time" of one-sixtieth of a second, corresponding to an unused field scan. The apparatus blanks the television video during this "dead time." This scanning method is referred to below as a "two on, one off" film frame scanning sequence.

Figure 4:
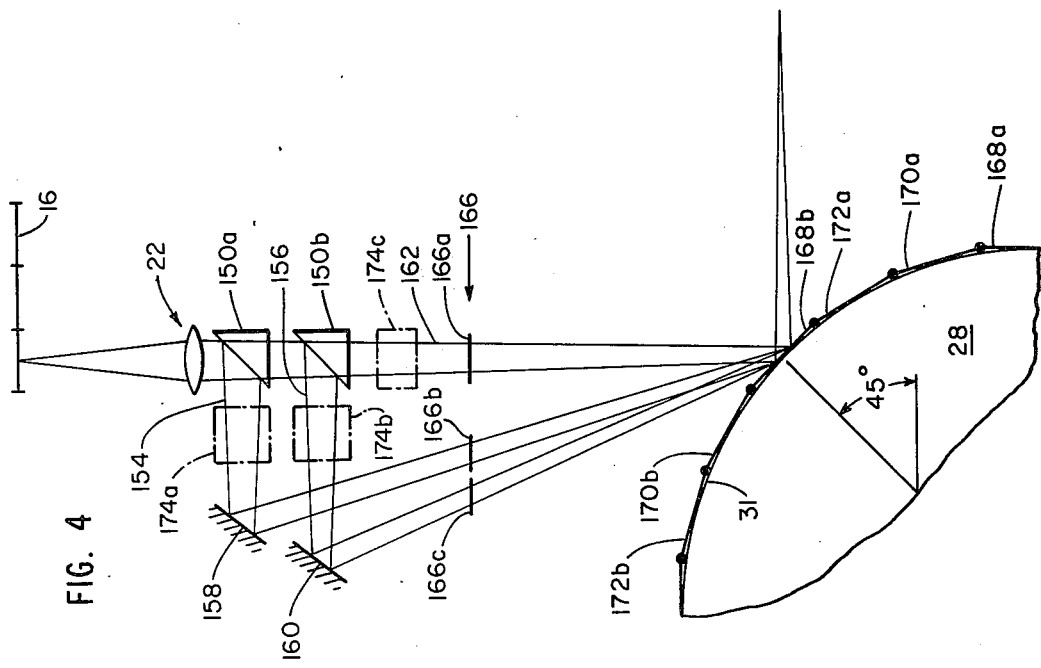
FIG. 4 is a mechanical detail of an alternative embodiment for the construction of FIG. 3.

According to a second particular embodiment of the invention shown in FIGS. 3 and 4, a different predetermined film frame scanning sequence is used. In this second embodiment, the array scans each film frame image three times and displays each frame scan in one of three consecutive field scans respectively. This scanning method is referred to as the "three on" film frame scanning sequence.

Referring again to FIG. 1, the illustrated reflecting member 26 has a plurality of mirrors 30 mounted around a circular, cylindrical, peripheral surface 31 of the rotating drum member 28. A drive motor 28A is provided for rotatably driving the drum member 28. The synchronization unit 32 controls the speed and the phase of rotation of the drum drive motor 28A with signals over lines 44 and it preferably monitors, over lines 46, the angular position and the speed of rotation of drum member 28. The mirrors 30 are positionally mounted at or near the periphery of the rotating member 28 to provide, at a calculated drum member speed, the "two on, one off" scanning sequence, the "three on" scanning sequence, or another television receiver compatible sequence, for scanning each film frame image across the array 24 a predetermined number of one or more times. The mirrors 30 are typically grouped together in repeating patterns. The size and position of each mirror on the drum periphery can be calculated according to the geometric relationship of the rotating drum periphery to the array 24 and the projector 10, and according to the rate of movement of the film 16 in the viewing aperture 18, the scanning sequence, and the television field rate.

EXAMPLE I

As a first specific example of the invention of FIG. 1, FIG. 2 shows in an exaggerated scale the placement of mirrors around a portion of a drum member 28, in a typical "two on, one off" operating system. The rotating drum 28 has a radius of 4.15061 inches and rotates under the control of the synchronization unit 32 at a rate of one-quarter revolution per second. A radial plane 90 that passes through the drum rotational axis and makes an angle of 45° with the horizontal plane intersects the drum peripheral surface along a construction line 100a which is three inches from both the plane of the moving film 16 and the plane of the photosensitive array surface 25.

The circular cylindrical periphery 31 of the illustrated drum supports eighty groups 102 of mirrors, each group 102a, 102b, . . . , having two contiguous mirrors 104 and 106. Each group of mirrors 104, 106 has corresponding points located a distance, on the drum peripheral surface, equivalent to 4½ degrees of drum rotation from the corresponding mirror points of the immediately next or preceding group. Thus, the distances between parallel drum contacting lines 100a, 100b and between mirror to mirror-contacting lines 108a, 108b (FIGS. 2 and 2A) correspond to 4½ degrees of drum rotation. Each illustrated mirror group 102 has one mirror 104 which makes tangent contact with and receives support from the drum periphery along contacting lines 100. The second mirrors 106 of the illustrated mirror groups are, as noted above, contiguous with the first mirrors 104 along the contacting lines 108.

The illustrated mirror groups thus have first mirrors 104 tangent to the drum periphery at lines 100. Illustrated mirrors 104 have a width, in a tangential direction, of 0.14234 inches and a length in the direction of the drum rotation axis of about one inch. Each second mirror abuts the end of the first mirror with which it is grouped along a line 108, and makes an angle α of 1.57458° with the plane of that first mirror. Mirrors 106 each extend from a width of 0.14203 inches. The length of each second mirror 106 is about one inch.

The lengths of the mirrors 104, 106 are not critical as long as each is sufficient to collect illumination for the entire line scan. The mirrors can be secured to the drum in any convenient manner, for example, using a fast drying adhesive.

Thus, for the mirror position parameters described above, and for a film frame rate of twenty frames per second, drum 28 rotates in synchronism with the periodic electrical signals of electrical circuitry 36 under the control of signals from the synchronization unit, and each image of a film frame is scanned twice by the photosensitive surface in approximately 1/60 second per scan. Thus the predetermined film frame scanning sequence is selected so that each of the mirror groups respectively operates to sequentially redirect the projected light from the same film frame so as to effect two consecutive scans across the projected images of that film frame by the lineal array 24. The electrical circuit 36 further operates to blank the output from the array 24 during those time periods between mirror groups when projected images of the film are not redirected to the lineal array as previously discussed.

EXAMPLE II

Referring now to FIG. 3, for a typical "three-on" film frame scanning sequence, the rotating drum surface 31 supports a plurality of three-mirror groups 110 positioned around the periphery of the drum 28. Within each three-mirror group, the illustrated mirrors 112, 114, 116 are sequentially, circumferentially contiguous. As in Example I, the drum rotates at one-quarter revolution per second and has a radius of 4.15061 inches. Similarly, the placement of the drum relative to the plane of film movement and the plane of the photosensitive surface 25 is the same as in Example I.

In this embodiment, during each television field scan, the reflecting member 26 redirects the entire image of a film frame across the lineal array 24 for it to be scanned by the lineal array. Each of the two typical mirror groups 110a and 110b depicted in FIG. 3, in an exaggerated fashion, has three mirrors. However, unlike Example I, wherein each mirror is preferably a single integral component, in Example II mirrors 112 and 116 of each mirror group 110 are constructed in sections.

For illustration, the drum is oriented so that construction line 122b, corresponding to the beginning of the first mirror 112b of group 110b, lies in a plane passing through the rotation axis of the drum at an angle of 45° to the horizontal. The first mirror 112b lies in a plane which is tangent to and contacts the drum periphery at line 122b. Mirrors 112 have a width of about 0.14234 inches and a length of about one inch. Each second mirror 114 extends from the end 128 of the first mirror with which it is grouped and has a width of 0.14203 inches. The angle β between respective planes of the first and second mirrors of a group is 1.57458°.

Each third mirror 116 extends from the end 132 of the second mirror grouped therewith for a distance of 0.14174 inches. The planes of the second and third mirrors intersect at an angle γ of 1.579869°.

As shown in FIG. 3, the trailing portion 134 of the third mirror 116 of each group overlaps and blocks a leading portion 136 (indicated by the dashed lines) of first mirror 112 of the next succeeding group. In order to avoid optical blocking due to this overlap, first and third mirrors 112, 116 in each group each have two sections, a first movable section and a second section which is fixed in position. A mirror moving device 137 laterally moves a mirror portion or section between a first position in which it lies in the plane of and completes mirrors 116 of a first group and a second position, indicated by the dashed lines 136, in the plane of mirrors 112 in a next succeeding group. In the illustrated embodiment, each mirror group 110 has a movable section 138 having a width of 0.09982 inches and a length of about one inch. Each mirror 112 then, in operation, is made up of one movable section 138 in combination with a fixed section 140 having a length of 0.04252 inches, and each mirror 116 consists of the movable section 138 in combination with a fixed section 142 having a length of 0.04192 inches.

In operation according to the "three-on" film frame scanning sequence, during a first scan of the image of each film frame, the mirror moving device laterally positions mirror section 138 in the "down" or radially inward position, where it lies in the plane of the first mirror 112 represented by dashed line 136. After completing the first scan of the film frame image, the mirror moving device laterally positions the movable mirror section 138 in the upward or radially outward position, in the plane of the third mirror 116, where it is ready to redirect the projected image light for the third scan of a film frame image. After termination of the third full scan of a film frame image, i.e. the scan depending upon mirrors 116 as the reflecting element, and prior to the initiation of the first full scan of the next film frame image, the mirror moving device laterally moves mirror section 138 radially inward to the plane of the next first mirrors 112. Thus, at the beginning of the next first full scan, the mirror section 138 is in the plane of the first mirror 112 and the scan proceeds in a normal fashion.

The mirror moving element may be any convenient apparatus. Particularly preferred is apparatus employing cams synchronized with drum rotation to provide accurate and precise movement of the mirrors at the beginning and end of each first film frame image scan.

Thus, for a film frame rate of twenty frames per second, the drum reflects each film frame across the lineal array in one-sixtieth of a second, and in synchronism with the television timing signals. The predetermined film frame scanning sequence is thus selected so that each of the mirror groups operates respectively to sequentially redirect the projected light from the same film frame so as to effect three consecutive scans across the projected image of that film frame by the lineal array 24.

It should also be understood that although one of the three above-described mirrors are shown as movable, it would nevertheless also be possible to arrange the drum diameter and film to lineal array distance such that the three mirrors would not require any movement.

Mirror groups may also be arranged so as to comprise alternately spaced groups of two and four mirrors respectively. The first group of two mirrors would operate to redirect the projected light from the same film frame so as to effect two consecutive scans across the projected images of that film frame by the lineal array 24. Each film frame scan would provide the signal information for one complete television field scan, thus providing one complete television frame in 1/30 of a second. The next group of four mirrors would operate to redirect the projected light from the next film frame so as to effect four consecutive scans across the projected image of that next film frame by the lineal array 24. Each film frame scan would provide the signal information for one complete television field scan thus providing two complete television frames in 2/30 of a second. The process would be repeated in the aforementioned manner so that each consecutive film frame would be converted to signal information for display in an alternating, consecutive sequence between one and two television frames.

EXAMPLE III

Referring to FIG. 4, an alternate embodiment for implementing the "three on" film frame scanning sequence also eliminates the mirror group overlap and hence the need for a mirror moving device. According to this alternate embodiment of the invention, at least one and preferably two partially reflecting and partially transmitting optical elements 150 are positioned in the optical path between optical system 22 and drum 28. Each element 150 transmits a known percentage of the incident illumination substantially without altering the optical path and reflects a known percentage of the incident illumination. After the elements 150 are placed in optical alignment between drum member 28 and optical system 22, each illustrated element 150a, 150b reflects a known portion of the incident illumination along second optical paths 154, 156, respectively, to fully reflecting positionally fixed mirrors 158, 160 respectively. The illumination incident on mirrors 158, 160 is then reflected towards the reflecting peripheral surface of drum member 28.

By accurate and precisely controlled positioning of elements 150a, 150b and mirrors 158, 160, each optical path 154, 156 and the original optical path 162 can be associated with different ones of the scans of each film frame image. A shutter assembly 166, selectively operated by synchronization unit 32 selects and optically passes only one of the three optical paths 154, 156, 162 in a sequence corresponding to the relationship of the optical paths to drum supported mirrors 168, 170, 172 respectively. Thus the illustrated paths are selected in the following sequence: path 162, path 154, and path 156; successively corresponding to mirrors 168, 170, 172 respectively. The shutter 166 accordingly permits illumination to reach the drum from only one illumination path at a time. By a judicious choice of the positions of the fixed mirrors 158 and 160, the drum supported mirrors 168 and 172 will no longer overlap; and, if desired, the drum-supported mirrors can be positioned in tangent contact with the drum surface. It should be evident that each optical path 154, 156, and 162 in general has a different overall length and in general "carries" a different percentage of the illumination originally incident on element 150a. To compensate for the different optical paths, the optical system of the equipment has compensating elements 174a, 174b, 174c, preferably placed in optical alignment with the mirrors 158 and 160, the optical system 22, and elements 150a, 150b. Each compensating element 174 typically has one or more neutral density filters and lens elements to compensate for the different path lengths so that the brightness of the image scanned across the array 24 is the same no matter which optical path the shutter selects.

THE ELECTRICAL CIRCUIT

Referring in greater detail to FIG. 1, the electrical circuit 36 is substantially the same for each of Examples I, II, and III. The photosensitive array 24 as noted above has a plurality of lineally arranged and spaced-apart photosensitive elements with the photosensitive surface 25 directed toward the incoming illumination. A particularly useful array employs charge-coupled devices as the photosensitive elements; and one such product is the solid state line scanner manufactured by Reticon Corporation of Sunnyvale, Calif. under the trade designation "C Series Solid State Line Scanners."

In this Reticon scanner, each photosensitive element is connected in parallel with an integrating capacitor, and the scanned output is a sequence of pulses, each pulse being representative of the light impinging upon the corresponding photosensitive element during a known integration time. In a typical television application, a line scanner having 512 separate photosensitive elements, positioned on two mil centers (such as the Reticon RL-512 C), provides the required scanning resolution for adequate picture detail.

Thus, the illustrated line scanner 24 is sensitive to the impinging or received light energy. A train of phase-related clock signals from the synchronization unit 32, applied over lines 34, activates the photosensitive array. The illustrated synchronization unit has a clock pulse synchronization circuit 32a for generating the photosensitive array activation signals over lines 34, and a system synchronization element 32b for synchronizing the operation of the display equipment. The synchronization circuit 32a operates in response to synchronization signals from system synchronizing element 32b.

The illustrated clock pulse synchronization circuit 32a employs a Reticon RC-400A "motherboard" circuit. This Reticon circuit provides the necessary phases of the clock signal and the start pulses for driving the illustrated Reticon line scanner 24. The output of the Reticon line scanner 24 is provided over lines 38 to a drive amplifier 176, as illustrated, to substantially isolate the activated line scanner from external loading by the electrical circuit 36. The driver amplifier receives synchronization control signals from the synchronization unit over lines 177. The driver amplifier is, for example, a Reticon type RC-404 driver amplifier, which provides at its output a pulse signal of sufficient power to drive a video generator 178 over lines 180. The driver amplifier is generally necessary because the photosensitive array provides at its output substantially a "packet of charge" (a pulse signal) which is the output of the connected photosensitive element in parallel with a partially discharged capacitor. (The voltage across the parallel combination of the photosensitive element and the corresponding capacitor measures the integral of the light intercepted by the respective element during a known scanning time.)

The output of the driver amplifier over line 180 is applied to a video generator 178 which converts the signals received from the charge amplifier into a substantially "boxcar" type signal using an integrator 182 having an output (over lines 184) compatible with the video input of a television control signal generator 186. Integrator 182, for example a type OEI 9081 manufactured by Optical Electronics, Inc. of Tuscon, Ariz., has a charge amplifier with a reset switch and connected with a capacitive feedback element to provide the integration function, and a following sample-and-hold element. Thus, the capacitive feedback configuration of the charge amplifier implements the integrating function and delivers the integrator output over lines 184 under the timing control of signals over line 188 from the system synchronizing unit 32b, as a processed video signal. The television signal generator 186, which can be for example based on commercially available equipment such as a Heathkit type IG-5240 color alignment generator, provides an output video signal (on a selected television channel) over lines 190 which is compatible with a standard television format. Synchronizing signals from the generator 186 over lines 192 provide the basic timing signals for the system synchronizing unit 32b and hence for the entire system operation. Synchronization unit 32 also provides over lines 194 data signals indicative of the display system operation.

With this arrangement of the FIG. 1 system, the line scanner receives, during selected field scans, the image of an entire film frame sequentially passed across its photosensitive surface. The resulting display on the television screen is, during a single field scan, the entire film frame.

While the invention has been described in somewhat specific terms using specific, preferred, commercially available devices arranged in a particular preferred configuration, the invention is neither limited to the preferred embodiment nor it is limited to the particular devices described herein. Thus, other line scanners having different output signals, and different synchronization circuits, can be employed within the scope of the invention and the following claims. In addition, other configurations of rotating drum reflection devices can be used to scan the film frames, in the selected film frame scanning sequence, across the photosensitive array.

Other embodiments of the invention, including additions, subtractions, deletions and other modifcations of the preferred disclosed embodiments of the invention will be obvious to those skilled in the art and are within the scope of the following claims.

What is claimed is:

1. Apparatus for converting the video information from a multiframe transparent film strip to a television transmission signal suitable for receipt by a conventional television receiver which can display the video information derived from the film strip, said apparatus comprising:
    an elongated lineal array comprising a plurality of photosensitive elements for converting video information to electrical signal information;
    means for projecting an image of the film strip, said projecting means comprising a source of illumination together with a motor for moving the film strip past the illumination source at a generally uniform rate of speed;
    movable reflecting means stationed to receive said projected light from the film strip and redirecting the projected light onto said lineal array in a manner such that the projected image from each successive film frame is scanned by said lineal array in accordance with a predetermined film frame scanning sequence;
    drive means for moving said reflecting means;
    means for sequentially sampling the output of said lineal array and for converting said sampled signals to a television transmission signal suitable for transmission to a television receiver in order to display the video information received by said linear array; and
    control means for synchronizing said projecting means motor with said drive means so that said lineal array scans each film frame at a rate compatible with the field rate of the conventional television receiver.

2. The apparatus of claim 1 wherein said movable reflecting means comprises a rotating drum, said drive means comprises a motor for rotating said drum and said control means operates to synchronize the speed of said projection means motor to the speed of said reflecting means motor.

3. The apparatus of claim 2 wherein said reflecting means further comprises a plurality of discrete spaced apart reflecting elements disposed about the periphery of said drum.

4. The apparatus of claim 3 wherein the projection means motor moves said film strip at a film frame rate of twenty frames per second, wherein the conventional television field rate is sixty frames per second, and wherein said control means synchronizes the speed of said projection means motor and said drum drive means to effect a complete scan by said lineal array of the entire projected image of each film frame in approximately one-sixtieth of a second.

5. The apparatus of claim 4 wherein:
    said sequential sampling means includes means for generating television timing signals; and
    said control means is connected to receive said television timing signals to facilitate synchronizing said film movement and the speed of said projection means motor with said drum drive means.

6. The apparatus of claim 3 wherein the periphery of said drum comprises a generally cylindrical surface and each one of said reflecting elements is structured and arranged with respect to said cylindrical surface to redirect the projected light from a respective film frame to said lineal array so as to effect a scan by said lineal array across the entire projected image of the respective film frame upon rotation of said drum as synchronized by said control means.

7. The apparatus of claim 6 wherein said reflecting elements comprise a plurality of positionally repeating mirror groups circumferentially spaced apart around said cylindrical surface of said drive.

8. The apparatus of claim 7 wherein each group comprises a plurality of contiguously positioned mirrors in an end-to-end spatial arrangement.

9. The apparatus of claim 7 wherein one mirror only of each of said groups is positioned in tangential contact with said surface.

10. The apparatus of claim 9 wherein at least one mirror of each said group is positioned radially outward from the surface of said drum.

11. The apparatus of claim 7 wherein each mirror group comprises two mirrors and said mirror groups are circumferentially spaced apart from each other, said predetermined film frame scanning sequence being selected such that each of said two mirror groups operates respectively to sequentially redirect the projected light from the same film frame so as to effect two consecutive scans across the projected image of that film frame by said lineal array and said means for sequentially sampling comprises means for blanking the output of said lineal array during those time periods between mirror groups when projected images of the film are not redirected to said lineal array.

12. The apparatus of claim 7 wherein each mirror group comprises three mirrors, said predetermined film frame scanning sequence being selected such that each of said three mirror groups operates respectively to sequentially redirect the projected light from the same film frame so as to effect three consecutive scans across the projected images of that film frame by said lineal array.

13. The apparatus of claim 12 further comprising means for moving one mirror section of each mirror group in a radial direction from a first position in said each group to a second position in a next positionally adjacent group.

14. The apparatus of claim 7 further comprising at least one partially reflecting element positioned in optical alignment between said projection means and said drum, each partially reflective element reflecting a portion of the incident projected image away from said drum, at least one substantially fully reflecting second element, positioned for directing illumination incident thereon from a respective one of said partially reflecting elements toward said rotating drum peripheral surface for reflection toward said array, and shutter means for repetitively and selectively applying, according to a predetermined sequence, projected light from different ones of said partially reflecting element and said second reflecting element to the drum reflecting elements.

15. The apparatus of claim 14 wherein each of said peripherally mounted mirrors is in non-overlapping tangent orientation relative to the drum periphery.

16. The apparatus of claim 14 wherein the mirror groups comprise alternately spaced groups of two and four mirrors respectively wherein the groups of two mirrors each operate respectively to redirect the projected light from one film frame so as to effect two consecutive scans across the projected images of that film frame by said lineal array and wherein the groups of four mirrors each operate respectively to redirect the projected light from another film frame so as to effect four consecutive scans across the projected image of that other film frame by said lineal array.

* * * * *